United States Patent
Kathoefer

(10) Patent No.: US 8,653,421 B2
(45) Date of Patent: Feb. 18, 2014

(54) APPARATUS FOR HEATING WEATHER MASTS

(75) Inventor: Sebastian Kathoefer, Gross Wuestenfelde (DE)

(73) Assignee: Nordex Energy GmbH, Rostock (DE)

( * ) Notice: Subject to any disclaimer, the term of this patent is extended or adjusted under 35 U.S.C. 154(b) by 192 days.

(21) Appl. No.: 13/166,567

(22) Filed: Jun. 22, 2011

(65) Prior Publication Data

US 2011/0315670 A1    Dec. 29, 2011

(30) Foreign Application Priority Data

Jun. 23, 2010  (DE) .................... 20 2010 009 461 U

(51) Int. Cl.
*H05B 1/00*   (2006.01)

(52) U.S. Cl.
USPC ....................................... 219/213; 52/651.01

(58) Field of Classification Search
USPC ................ 219/213, 523; 73/1.29; 416/132 B; 52/651.01
See application file for complete search history.

(56) References Cited

U.S. PATENT DOCUMENTS

| | | | |
|---|---|---|---|
| 4,507,916 A * | 4/1985 | Anderson | 60/641.1 |
| 7,057,305 B2 * | 6/2006 | Kruger-Gotzmann et al. | 290/55 |
| 2008/0141768 A1 * | 6/2008 | Ormel et al. | 73/170.07 |
| 2009/0012724 A1 * | 1/2009 | Voss et al. | 702/34 |
| 2010/0119370 A1 * | 5/2010 | Myhr | 416/39 |

FOREIGN PATENT DOCUMENTS

| | | |
|---|---|---|
| DE | 29 16 504 | 9/1980 |
| DE | 20200600081 | 3/2006 |

* cited by examiner

*Primary Examiner* — Henry Yuen
*Assistant Examiner* — John Wasaff
(74) *Attorney, Agent, or Firm* — Jordan and Hamburg LLP

(57) ABSTRACT

The invention relates to a device for heating weather masts on wind turbines. The object of the invention is to eliminate the drawbacks of the prior art and to keep the weather masts of a wind turbine free of ice. The device according to the invention for heating a weather mast on a wind turbine is that the weather mast comprises interconnected pipings. In the pipings, there is arranged a heating system which is formed by one or a plurality of electric heating wires.

10 Claims, 3 Drawing Sheets

APPARATUS FOR HEATING WEATHER MASTS

BACKGROUND OF THE INVENTION

The invention relates to a device for heating weather masts on wind turbines.

On wind turbines different types of anemometers and tail vanes for the determination of the wind speed and wind direction. These are fixed to weather masts which are usually situated on the roof of the wind turbine nacelle. The weather masts each consist of a stand and a lightning protective cage which surrounds the sensors mounted on the weather mast for the protection from lightning stroke. Under certain meteorological conditions, in particular between 0 and −10° C., the external components of wind turbines such as wind sensors and weather masts are icing up. This can result in undesirably high mechanical loads and in inaccuracies of the measurements.

Herein, the counter actions such as the heated wind sensors described in DE 202006000816 U1 are of limited use since the lightning protective cages of the weather masts are icing up as well. Due to this ice build-up the flow conditions on the wind sensor are changed whereby the measured values become highly inaccurate.

Experience has shown that the renouncement of an encapsulating lightning protective cage (Faraday cage) results in damage of the wind sensors due to a lightning stroke.

In EP 2154364 A1, is disclosed a wind turbine in which a cooling air outlet of the nacelle is directed toward the anemometers and thus the excess heat of the rotor is to provide for warming the environmental air of the anemometers. The drawback of this solution is that an undisturbed wind measurement will be impaired by the flow of outlet air resulting in inaccuracies of the measuring results, in particular of the measurement of the wind direction.

DE 2916504 B1 discloses cup stars for anemometers or wind turbines for power generation which comprise simple heating devices, such as e.g. foils, wires or ribbons in the cup.

SUMMARY OF THE INVENTION

The object of the invention is to eliminate the drawbacks of the prior art, and to keep the weather masts of a wind turbine free of ice.

The idea according to the invention is to fabricate the weather mast from interconnected pipings. Usually, the weather mast is fabricated from solid profiles. The cross-section of the profiles is dimensioned such that they are provided with a high conductance and that they arrest the lightning current safely. According to the invention, these solid profiles are substituted by pipings which enable heat to be selectively fed to the weather mast in order to keep it free of ice. The wall thickness of the pipes is selected such that arresting the lightning current is ensured.

In a preferred embodiment, a heating system is arranged in the pipings. The heating system is provided by one or a plurality of electric heating wires. As the pipes of the weather mast can be heated directly by such heating wires relatively little heating power is required, and the heating power is selectively concentrated in the area of the wind sensors.

The heating wires are connected to a power supply and are connected to earth separately from the weather mast. Thus, lightning protection will not be impaired, and also the heating wires are protected against lightning stroke (Faraday cage).

In a preferred embodiment the heating system is formed in a self-regulating manner. By the application of self-regulating heating bands the heat output can directly be adapted to an increasing or decreasing temperature of the weather masts. Thus the power consumption of the heating system is reduced.

Alternatively, the heating system can be controlled by a separate control means or by the plant control of the wind turbine.

In a particular embodiment there exist a plurality of weather masts on the wind turbine, the heating systems of which are connected in parallel with each other.

By heating the weather masts by means of inside heating wires the availability of the wind turbine can be improved because its operation is not impaired by ice build-up on the weather masts.

BRIEF DESCRIPTION OF THE DRAWINGS

The invention will be explained in more detail on the basis of drawings. For this.

DETAILED DESCRIPTION OF THE DRAWINGS

Figure 1:
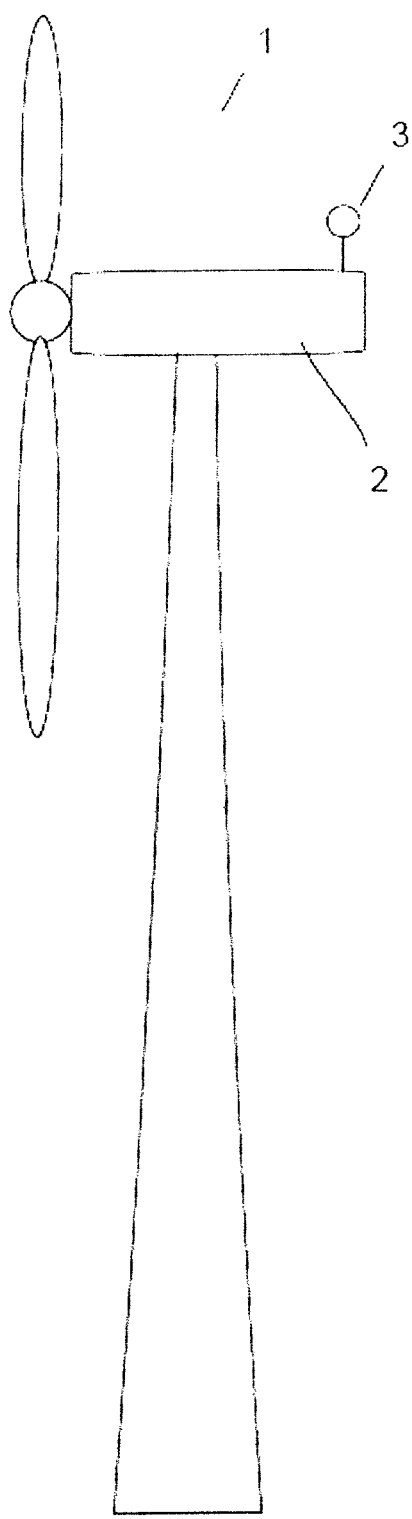
FIG. 1 shows a schematic view of a wind turbine.

FIG. 1 shows a schematic view of a wind turbine 1 including a weather mast 3 situated on the roof of the nacelle 2.

Figure 2:
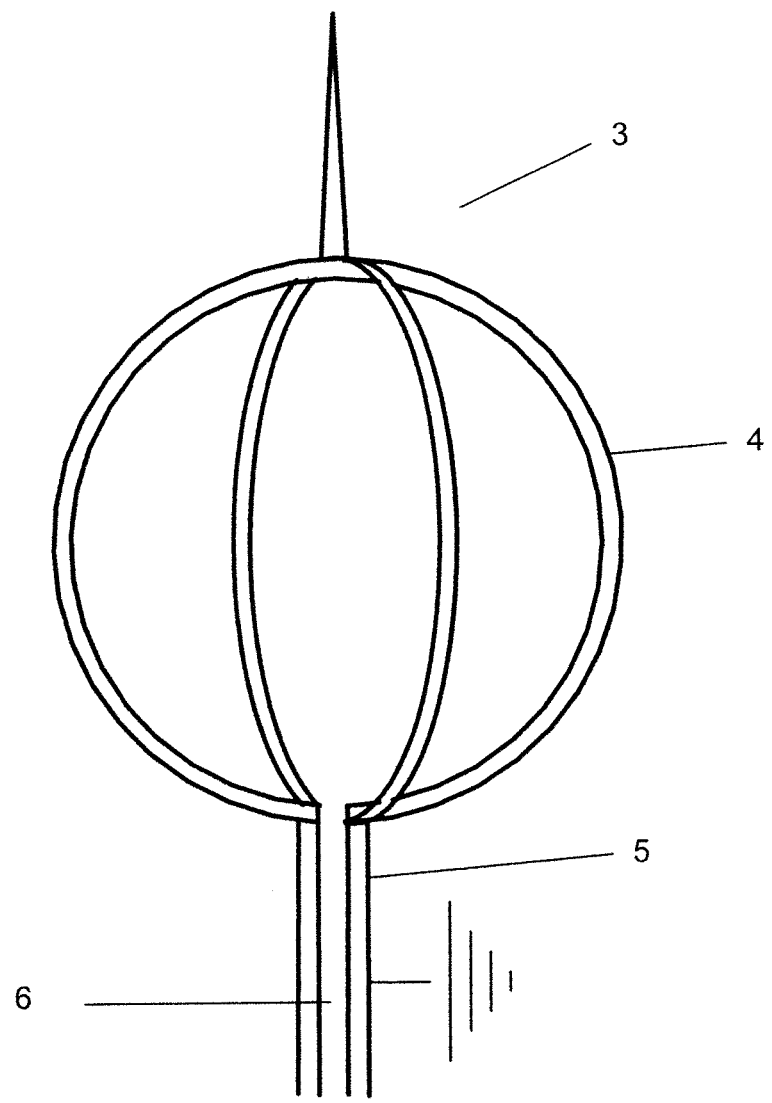
FIG. 2 shows the structure of a weather mast according to the invention.

In FIG. 2, there is shown the structure of a weather mast 3 according to the invention. The stand 6 and the lightning protective cage 4 of the weather mast comprise pipings 5 which are interconnected. The lightning protective cage is formed of two circularly bent pipings 5 which are staggered by 90°. However, a placement at an angle of between 60° and 90° is also possible.

Figure 3:
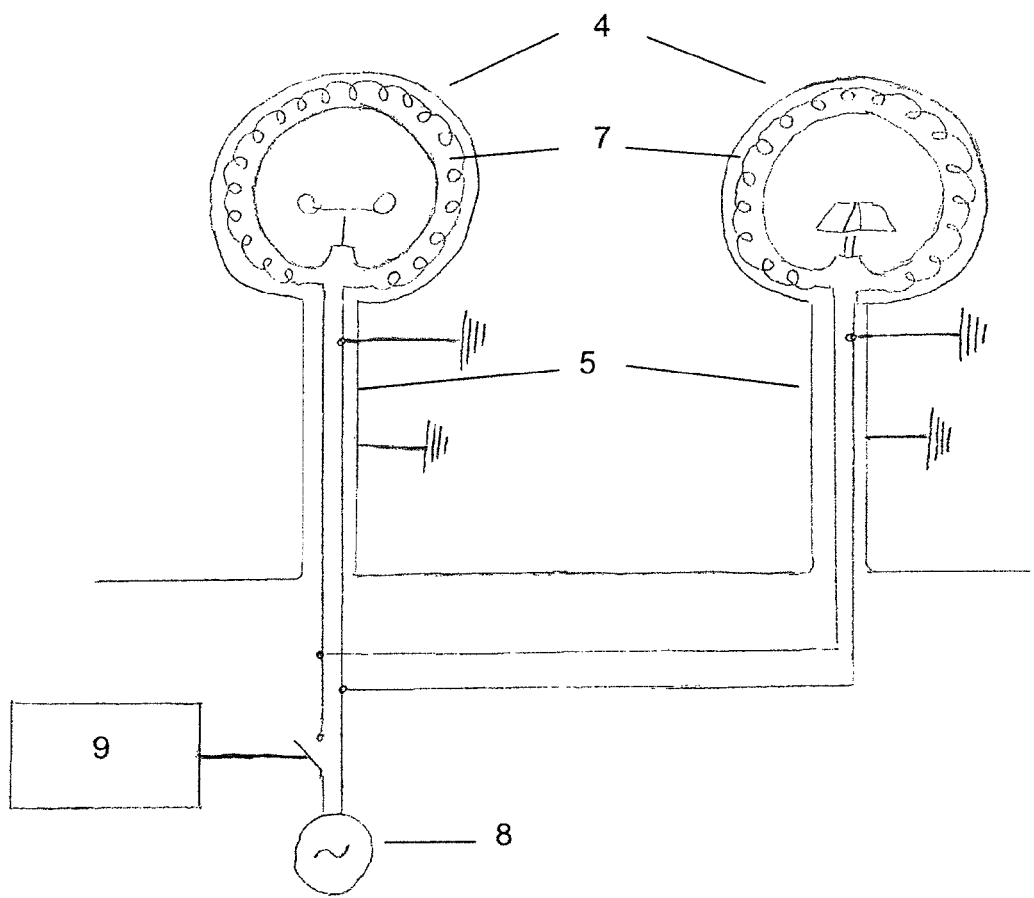
FIG. 3 shows a circuit diagram including a schematic illustration of the heating wires in the weather masts.

In FIG. 3, there is shown an embodiment of the solution according to the invention. On the nacelle (not shown) of the wind turbine there are arranged two weather masts. One or a plurality of heating wires 7 are installed into the pipings of the stands 6 and the lightning protective cages 4. These heating wires 7 of the individual weather masts 3 are connected in parallel and are connected to a power supply 8. The piping of the weather mast 3 and the heating wires 7 are connected to earth separately. Thus, the lightning protection will not be impaired and the heating wires 7 are protected against lightning stroke as well (Faraday cage).

In the illustrated embodiment the control of the heating system is carried out by means of the plant control 9 of the wind turbine. From an adjustable environmental condition on (e.g. temperature threshold value) the heating system is energized. Thus, it is made sure that the measurement of the wind speed and of the wind direction will not be impaired by ice build-up on the weather masts 3 which would result in a plant standstill meaning a yield loss. In combination with a reliable ice warning system and an intelligent control system it is possible to further reduce the energy demand for the heating system.

The heating wires 7 are maintenance-free and can easily be replaced in the event of damage without jeopardizing the operation of the plant.

The invention claimed is:

1. A wind turbine comprising a nacelle and at least one weather mast situated on the nacelle so as to be exposed to exterior environmental conditions;

wherein the at least one weather mast comprises: an electric heating wire; and a lightning protective cage consisting of interconnected pipings;

wherein the interconnected pipings exhibit an electrical ground connection that conducts a lightning strike to earth;

wherein the electric heating wire is situated inside a piping of the interconnected pipings;

wherein the electric heating wire is coupled to a power source to receive current, and is coupled to earth so as to exhibit an electrical ground connection that conducts a lightning strike to the earth; and wherein the electrical ground connection of the interconnected pipings is independent of the electrical ground connection of the electric heating wire.

2. The wind turbine of claim 1, wherein the electric heating wire is part of an electric heating system that is self-regulating.

3. The wind turbine of claim 1, further comprising: a wind turbine generator; an electric heating system comprising said electric heating wire; a control for the wind turbine generator; and a separate control for the electric heating system.

4. The wind turbine of claim 1, further comprising: a wind turbine generator, an electric heating system comprising said electric heating wire; and a control for the wind turbine generator, which also controls the electric heating system.

5. A wind turbine comprising a nacelle and at least one weather mast situated on the nacelle exposed to an external environment of the wind turbine;

wherein each one weather mast comprises a lightning protective cage and an electric heating wire;

wherein the lightning protective cage is situated above the nacelle and consists of interconnected pipings, said lightning protective cage having openings to the external environment between the interconnected pipings so as to form an open profile for said one weather mast;

wherein the interconnected pipings have a connection to earth as an electrical ground for channeling a lightning strike to earth;

wherein the electric heating wire is situated within a piping of the interconnected pipings and is coupled to a power supply to receive current and has a connection to the earth as an electrical ground, the electric heating wire being for altering temperature of said pipings of said one weather mast; and wherein the connection of the interconnected pipings to earth is independent of the connection of the electric heating wire to earth so that a lightning strike to the interconnected pipings has a path to earth that is separate from a path to earth of current flowing from the power supply to the electric heating wire.

6. The wind turbine of claim 5, further comprising: a wind turbine generator; an electric heating system comprising said electric heating wire; a control for the wind turbine generator; and a separate control for the electric heating system.

7. The wind turbine of claim 6, wherein the electric heating system is self-regulating.

8. The wind turbine of claim 5, further comprising: a wind turbine generator; an electric heating system comprising said electric heating wire; and a control for the wind turbine generator, which also controls the electric heating system.

9. The wind turbine of claim 8, wherein the electric heating system is self-regulating.

10. A wind turbine of claim 5, wherein said at least one weather mast comprises at least two weather masts, wherein the electric heating wire of each one of the at least two weather masts are connected in parallel.

* * * * *